(No Model.)
L. DUNN.
HITCHING CLAMP.
No. 513,768. Patented Jan. 30, 1894.
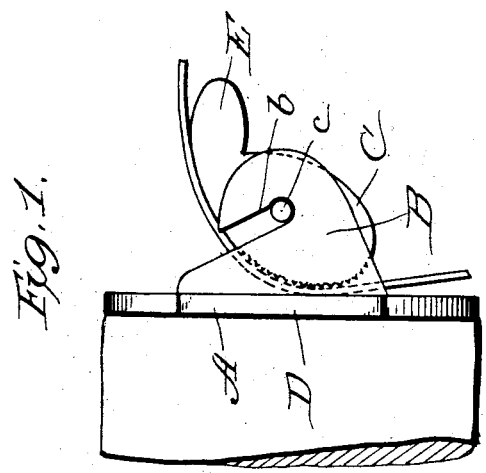
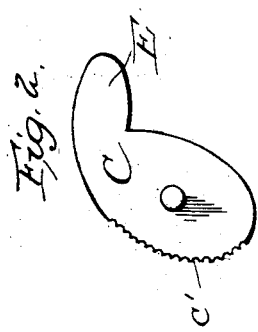
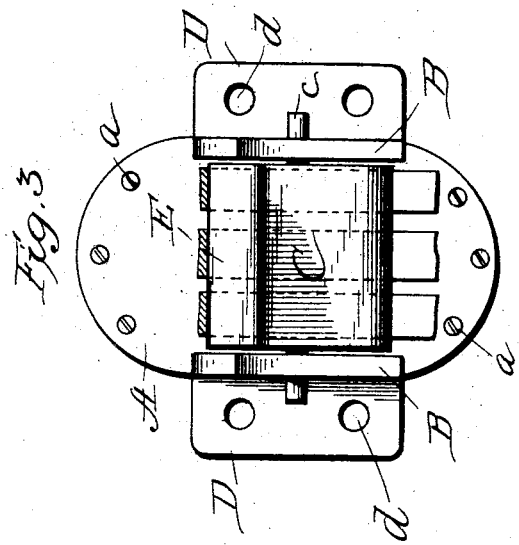
Attest
Wm. T. Hall.
James M. Shear.
Inventor
Lawrence Dunn
by Walter Donaldson
Atty

UNITED STATES PATENT OFFICE.

LAWRENCE DUNN, OF PACIFIC, MISSOURI.

HITCHING-CLAMP.

SPECIFICATION forming part of Letters Patent No. 513,768, dated January 30, 1894.

Application filed April 24, 1893. Serial No. 471,631. (No model.)

*To all whom it may concern:*

Be it known that I, LAWRENCE DUNN, a citizen of the United States of America, residing at Pacific, in the county of Franklin and State of Missouri, have invented certain new and useful Improvements in Hitching Ties or Clamps, of which the following is a specification, reference being had therein to the accompanying drawings.

My invention is an improved hitching clamp for hitching or securing lines of any kind, such for instance as the halters of horses, and the object of the invention is to provide a simple form of clamp adapted to automatically hold one or more lines firmly in the desired position. I have also aimed to provide a construction in which the clamping dog or roller may be removed and replaced in the event of its becoming worn or otherwise damaged.

The invention is illustrated in the accompanying drawings, in which—

Figure 1, represents a side elevation of my improved clamp secured to a hitching post. Fig. 2, is a detailed view showing the clamping roller removed. Fig. 3, is a front view showing several lines held by the same clamp.

The invention comprises a plate A having projections B, upon the face on each side in which is pivotally mounted the clamping dog or roller C, as will be hereinafter described. The plate A, is provided with a plurality of holes as at $a$, through which the screws or nails pass which secure it to the post. I find that it is also desirable to provide two wings or projections D', D', one upon each side of the plate, and provided with openings $d$, through which a rope or wire may be passed for fastening it to a tree when nails or screws cannot be conveniently used. The projections B before referred to project forward from the front face of the plate upon each side, and are provided with slots $b$ which extend from the upper edge downward and slightly outward and serve as bearings for the pivot or axle $c$, of the roller or dog C. The plate with its projecting wings may be cast, or otherwise formed, in one piece. The dog may also be cast in one piece with the projecting pivots $c$, and the handle E, thus forming a very simple device of but two pieces. The dog is formed in the shape of an eccentric so that the downward movement of the handle portion will cause the rear side to bind against the face of the plate and firmly clamp the line which may be inserted in the space behind when the handle is raised. To prevent the rope or line slipping the rear face of the dog is corrugated as at $c'$.

The handle E forms a convenient means for rotating the dog to unclamp the line while at the same time its upper face occupies such a position as to form a rounded bearing for the line, the pressure from which will serve very effectually to keep the dog firmly clamped, and increase of strain upon the line will only serve to clamp it the tighter. When however it is desired to release the line the handle is raised by the hand which removes the rear face of the dog from contact with the plate. The inclination of the slots prevents the pivots from accidentally slipping out when the handle is raised, but the dog may easily be removed after the handle is raised to its full extent by simply lifting the pivots out of the slots.

I prefer to form the clamping device comparatively wide as shown, as this construction particularly adapts it to clamp a leather strap, or several lines at the same time.

In Fig. 3, I have shown a number of lines held by one clamp, this being often very desirable when the clamp is used as a clothes line clamp when the lines radiate from one point. All the lines in this event will be securely held, while if it is desired to tighten them or any one of them this may be done by grasping the free ends of the lines and drawing down upon those which are loose, the dog unclamping automatically and gripping them again as soon as they are released.

While I have described the device as particularly adapted for hitching horses, &c., it will be understood that I do not desire to be limited in this respect as it might be used for securing any sort of line such as a clothes line, or in stretching wires and the like.

I claim—

A clamp comprising the supporting plate, lugs projecting therefrom having open-ended slots inclining upwardly and inwardly, an eccentric having a broad bearing face with journals adapted to enter the slots of the lugs and easily removable therefrom through the open ends, the inclination of the slots tending to properly seat the eccentric and prevent displacement thereof, substantially as described.

In testimony whereof I affix my signature in presence of two witnesses.

LAWRENCE DUNN.

Witnesses:
 WM. MAUTHE,
 JNO. MAUTHE.